Oct. 4, 1932.  S. H. CHILDS  1,880,801
OIL VALVE
Filed June 30, 1930
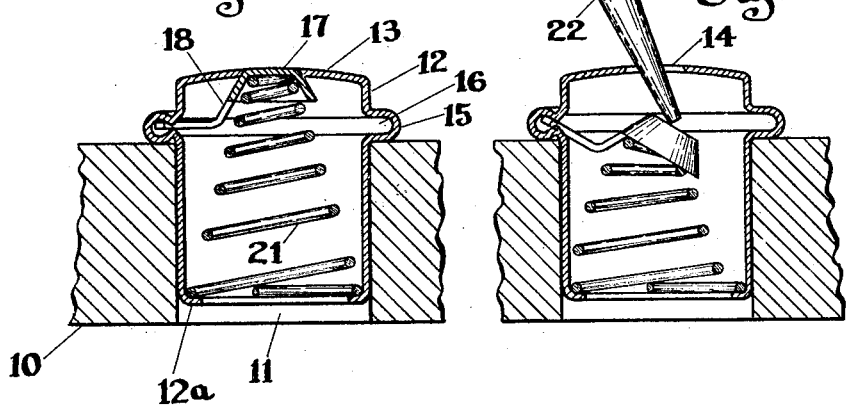
Inventor
Sterry H. Childs.
By Ernest R. Llewellyn
Attorney Patented Oct. 4, 1932

1,880,801

UNITED STATES PATENT OFFICE

STERRY H. CHILDS, OF LITCHFIELD, CONNECTICUT

OIL VALVE

Application filed June 30, 1930. Serial No. 465,053.

This invention relates to lubricating oil valves of the type adapted to be inserted in an opening of a bearing which has supported therein a movable or rotatable member.

In the various classes of machines it has been common practice to provide an aperture or oil-hole extending from the outer surface of the bearing to the bore in which, for example, a shaft is journaled. It is desirous to keep this oil-hole covered to prevent foreign matter from entering the bearing which would generate heat and cause excessive wear on the bearing surfaces. Numerous means have been utilized to accomplish this result as for example, various types of covers or oil plugs, the most desirable of which is an oil valve of the shell type that can be inserted in the bearing and not project to any great extent beyond the outside surface of the bearing. This eliminates the possibility of the valve being accidentally knocked off.

In valves of the above character, a shell with a passage therethrough is inserted in the aperture of the bearing. A diaphragm is mounted within the shell and movable vertically therein to close one end of said passage, said diaphragm being provided with downwardly extending lateral projections that engage the inner wall of the shell thus permitting movement of the diaphragm and projections parallel to the side walls. A typical illustration of a device of this character is the one shown in United States Letters Patent No. 678,931. A compression spring retains the diaphragm in engagement with and hermetically seals the outer opening of the shell.

With this construction, when an oil can spout is inserted through the outer opening of the valve and the diaphragm is compressed, unless due care is exercised, the passage in the oil can spout will be obstructed by the diaphragm and thereby prevent the free flow of the lubricant from the oil can through the valve of the bearing.

The object of my present invention is to provide a simple and efficient valve for oil-holes and the like that can be manufactured at a minimum cost; that is capable of hermetically sealing the outer oil aperture; and, when it is desired to introduce lubricant through the valve, the sealing member will be so positioned as to allow a free and ample passage without obstructing the flow from the introducing member.

With the above and other objects in view, my invention consists in a novel construction and arrangement of parts hereinafter described and more specifically pointed out in the appended claims.

In the accompanying drawing I have shown my improved oil-valve sufficient to enable those skilled in the art to understand the construction and operation thereof.

Referring to the drawing:—

Fig. 1 is a vertical section of my oil valve inserted in a portion of a bearing;

Fig. 2 is a view corresponding to Fig. 1 but shows some of the parts in a different position;

Fig. 3 is a plan view of my oil valve; and,

Fig. 4 is an enlarged sectional view of the hinge portion of my oil valve.

In the accompanying drawing 10 is a portion of a bearing having an aperture 11 formed therein to receive the valve shell 12. The shell body 12 is cylindrical in cross-section and provided with an end wall 13, said end wall having formed therein a central circular opening 14. The shell body 12 has formed therein a flange 15 having an internal annular recess 16.

The circular opening 14 is hermetically closed by a cup shaped diaphragm 17, see Fig. 1, which has extending therefrom an arm 18 which terminates in a T shaped end 18a which forms the hinge pin for the diaphragm. The hinge pin end of the arm 18 engages in the annular recess 16 and is retained therein by means of the flange 15 being depressed at the points 19 and 20 thereby forming a fulcrum for the diaphragm.

The shell body 12 is provided, at the open end thereof, with an inwardly extending flange 12a that forms a bearing for one end of the compression spring 21. The opposite end of said spring has its bearing in the cup shaped diaphragm 17 and acts to normally retain the diaphragm in a closed position as shown at Fig. 1.

When the oil can spout 22 is inserted through the aperture 14, see Fig. 2, the spring 21 is compressed by the diaphragm 17 which swings on its pivot 18a. It will be observed that should the spout 22 be inserted in a vertical position the diaphragm 17 would be deflected on an angle thereby eliminating the possibility of obstructing the passage in the spout 22 through which the lubricant passes through the valve to the bearing.

Having thus described my invention it will be evident to those skilled in the art that certain changes and modifications may be made therein by those skilled in the art without departing from the spirit and scope thereof, therefore, I do not wish to be limited to the specific details herein disclosed but what I claim is:—

1. An oil valve comprising a shell or case having a lateral, horizontally extending, substantially U-shaped annular flange formed integral therewith, a passage through said shell or case, a member, pivotally secured within said U-shaped flange, by which said passage is closed, means for retaining said member and passage in a normally closed position.

2. An oil valve comprising a shell or case having a substantially closed end with a central opening therethrough, a horizontally extending U-shaped annular flange formed integral with said closed end and said shell, a member, pivotally secured within said U-shaped flange, by which said central opening is closed, means for retaining said member and opening in a normally closed position.

3. An oil valve comprising a shell or case having a substantially closed end with a central opening therethrough, a substantially U-shaped annular flange formed integral with said closed end and said shell, a member engaging said central opening, said member having a substantially T-shaped portion formed integral therewith and pivotally supported in said annular flange, means for normally retaining said member in engagement with said opening.

4. An oil valve comprising a cylindrical shell having a substantially closed end with a central opening therethrough, a substantially U-shaped flange disposed between said closed end and the cylindrical shell, said flange having pivotally supported therein a pivotal extension of a cup-shaped member, said cup-shaped member engaging said central opening, means for normally retaining said cup-shaped member in engagement with said opening.

In testimony whereof I have hereunto set my hand.

STERRY H. CHILDS.